United States Patent [19]

Wells

[11] 4,384,203

[45] May 17, 1983

[54] OPTICAL FIBER ANGLE POSITION SENSOR

[75] Inventor: Robert C. Wells, Endwell, N.Y.

[73] Assignee: General Electric Company, Binghamton, N.Y.

[21] Appl. No.: 264,271

[22] Filed: May 18, 1981

[51] Int. Cl.³ .............................................. G02B 5/14
[52] U.S. Cl. .............................. 250/227; 250/231 SE; 250/551; 350/96.15
[58] Field of Search ................ 250/227, 551, 231 GY, 250/231 SE; 356/138, 152; 350/96.15

[56] References Cited

U.S. PATENT DOCUMENTS

| | | |
|---|---|---|
| 4,056,722 | 11/1977 | Ray .................................. 250/231 SE |
| 4,060,725 | 11/1977 | Hoshika ............................. 250/227 |
| 4,165,496 | 8/1979 | Di Domenico, Jr. et al. ... 331/94.5 S |
| 4,250,380 | 2/1981 | Iyeta ............................. 250/231 SE |
| 4,303,300 | 12/1981 | Pressiat et al. .................... 350/96.20 |

Primary Examiner—David C. Nelms
Assistant Examiner—J. Brophy
Attorney, Agent, or Firm—Arthur E. Bahr; I. David Blumenfeld; Stephen A. Young

[57] ABSTRACT

An optical fiber position sensor wherein a first member is rotationally movable with respect to a second member. A generally rod-shaped fiber optic cable is provided having two elongated portions in close axial alignment. The interface surfaces of the two portions have equal face angles of approximately 30–35 degrees from the longitudinal axis. One of the cable portions is secured to the first member and the other cable portion is secured to the second member. When the interface surfaces are parallel, most of the radiation received into the first cable portion from a source of electromagnetic radiation, an LED, is transmitted through to the second cable portion, and when the interface surfaces are non-parallel as a function of the rotation of one of the members with respect to the other, radiation will be reflected at the interface surfaces of the second cable portion in varying amounts as a function of angular displacement of the cable portion relative to the first cable portion, such resulting in attenuation of radiation being transmitted through the cable, that radiation being representative of the location of the movable member with respect to the fixed member.

7 Claims, 1 Drawing Figure

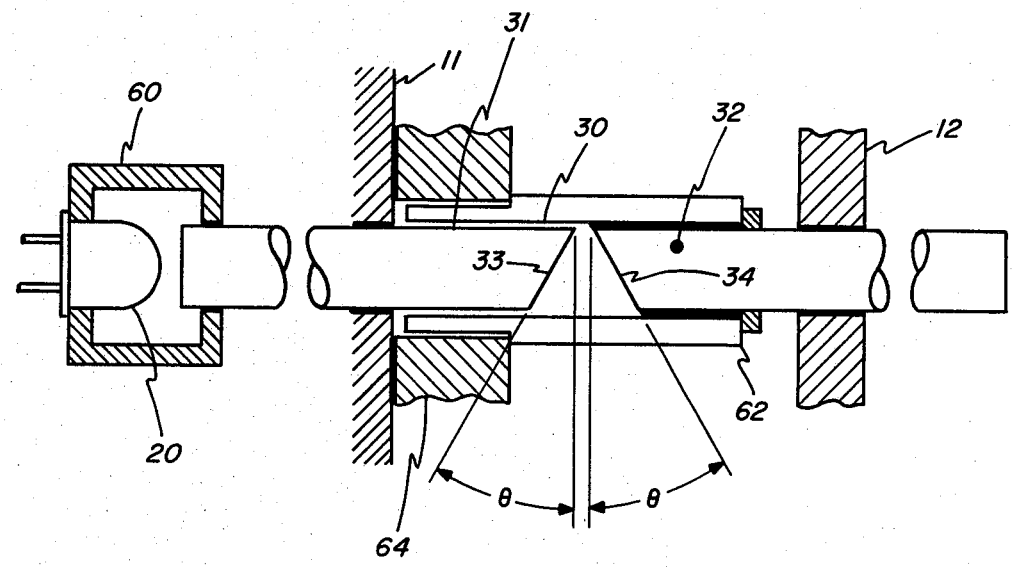

OPTICAL FIBER ANGLE POSITION SENSOR

BACKGROUND OF THE INVENTION

1. Field of the Invention

The present invention relates to a position sensing device, and more particularly, to an optical fiber position sensor for determining the position, or location, at any given time of an element rotationally movable with respect to another element fixed relative to the movable element.

2. Description of the Prior Art

In present day flight control systems, the position of most actuator control surfaces of an aircraft are sensed with an electromagnetic, linearly variable, differential transformer (LVDT). The conventional electromagnetic LVDT is an extremely simple device with high linearity and nearly infinite resolution, and which can operate in rather adverse environments (high and low temperatures, vibration, shock, etc.). However, conventional LVDT's are bulky and heavy, require special frequency excitation, and produce amplitude modulated AC output signals which are cumbersome to convert. Furthermore, a quad-redundant actuator requires a total of 16 LVDT's, a significant volume and weight. Since reduction of component weight and size is given high priority in aircraft design, it is desirable to provide an actuator position sensor which is smaller, lighter in weight, and simpler of construction and operation than the conventional LVDT.

In anticipation of increased use of optical components in flight control systems, starting with a fiber optic data link and eventually leading to a totally fly-by-light system, actuator position sensors must interface with other optical components. The above features, therefore, can only be effectively achieved with a direct optical to optical interface.

It is therefore an object of the present invention to provide a position sensor which is simpler, smaller, and lighter in weight than conventional LVDT's and which is, at the same time, capable of performance equal to or better than that available with conventional LVDT's and which requires a minimum of interface hardware and is compatible with a fly-by-light system.

SUMMARY OF THE INVENTION

In accordance with the present invention, there is provided apparatus for determining the position of a first element relative to a second element, one of the first and second elements being rotationally movable relative to the other. Included is a source of electromagnetic radiation, the source being adapted to be fixedly secured to the first element. Also included is an optical fiber cable including first and second elongated portion in coaxial alignment and closely axially fixed relative to one another. The first cable portion is fixedly secured to the source and is adapted to receive and transmit therethrough radiation from the source. The second cable portion is adapted to be fixedly secured to the second element. One of the first and second cable portions is rotatable about its longitudinal axis relative to the other as a function of rotational movement of the element to which it is secured. The respective cable portions have interface surfaces with face angles of approximately equivalent magnitude, whereby, when the interface surfaces are parallel, a major portion of the radiation transmitted through and exiting the first cable portion will be received by and transmitted through the second cable portion, and when the interface surfaces are non-parallel, radiation exiting the first cable portion will be reflected at the interface surface of the second cable portion in varying amounts as a function of angular displacement from parallel of the second cable portion with respect to the first cable portion, maximal reflection occurring when the interface surfaces are rotated 180° from the true parallel position, thereby resulting in attenuation of radiation being transmitted through the cable.

BRIEF DESCRIPTION OF THE DRAWING

In the accompanying drawing there is shown the preferred embodiment of the optical fiber position sensor of the present invention.

DESCRIPTION OF THE PREFERRED EMBODIMENT

In accordance with the present invention, and referring now to the drawing, there is shown the preferred embodiment of the optical fiber position sensor of the present invention. Such a position sensor is useful for determining the position of a first element, such as first member 11, relative to a second element, such as second member 12, one of the members 11 and 12 being rotationally movable with respect to the other. The position sensor includes a source of electromagnetic radiation, such as a light emitting diode (LED) 20.

An optical fiber cable 30 includes first and second elongated, rod shaped portions 31 and 32 respectively, the portions 31 and 32 being in coincident axial alignment and axially fixed relative to one another. First cable portion 31 is located relative to and fixedly secured to LED 20 through a mounting and alignment bracket 60. First cable portion 31 is adapted to receive and transmit therethrough radiation from the LED 20 and is fixedly secured to first member 11, thus also securing LED 20 to first member 11. Second cable portion 32 is fixedly secured to second member 12 and is retained in coaxial alignment with first cable portion 31 through an alignment sleeve 62 to which it is also fixedly secured. A housing member 64 is fixedly secured to first member 11 and allows for rotational movement and maintains close axial position (by any suitable means such as a retaining snap ring or a ball and groove arrangement, not shown, capable of engaging alignment sleeve 62 and housing member 64, for example) of alignment sleeve 62 and thereby second cable portion 32 and the second member 12 to which it is secured relative to first member 11.

First and second cable portions 31 and 32 are provided with interface surfaces having face angles $\theta$ of approximately equivalent magnitude. With such an arrangement, when interface surfaces 33 and 34 are parallel, a major portion of radiation from LED 20 which is transmitted through and exiting from first cable portion 31 will be received by and transmitted through second cable portion 32. Furthermore, when the interface surfaces 33 and 34 are non-parallel, radiation exiting first cable portion 31 will be reflected at the interface surface 34 of second cable portion 32 in varying degrees as a function of angular displacement from parallel of the interface 34 of second cable portion 32 relative to interface 33 of first cable portion 31. With this arrangement, maximal reflection and thereby minimal transmission through second cable portion 32 occurs when the interface surfaces 33 and 34 are rotated 180 degrees from the true parallel position, and such results in maximal attenuation of radiation being transmitted through the cable 30.

A radiation measuring instrument (not shown) is provided for measuring the intensity of radiation being transmitted through and exiting from the second cable portion 32, the intensity being proportional to the angular displacement from parallel of the interface 34 of second cable portion 32, and thereby second member 12, relative to the interface 33 of first cable portion 31, and thereby first member 11. Such an instrument may take the form of a light meter incorporating a photovoltaic detector, and which is responsive to the radiation employed.

In the preferred embodiment, the face angles of the interface surfaces 33 and 34 have been chosen to be between 30 and 35 degrees relative to the longitudinal axis of the optical fiber cable. Of course, it is desirable that first and second cable portions 31 and 32 be fixed axially relative to one another and that the spacing between the two cable portions be at a minimum to insure against unnecessary radiation loss. This spacing between the two cable portions will depend upon the diameter of the cable chosen. With a cable consisting of a single optical fiber (or a multiple fiber may be used) (DuPont PIR-140) of 400 um diameter, a suitable spacing was found to be from 0.002 inches to 0.005 inches. Also in the preferred embodiment, the radiation source chosen was an LED having a small radiation cone angle and emitting in the infrared portion of the electromagnetic spectrum. Such an LED is the Monsanto ME-7124 with a 3 mW typical IR output.

While a position determining or sensing device has been described in what is presently considered to be the preferred embodiment of the invention, it will be apparent to those skilled in the art that various changes and modifications may be made in the structure and in the instrumentalities utilized without departing from the invention. The appended claims are intended to include such modifications and changes, and equivalent variations, as coming within the true spirit and scope of the invention.

I claim:

1. Apparatus for determining the position of a first element relative to a second element, one of said first and second elements being rotationally movable relative the other, comprising:

a source of electromagnetic radiation, the source being adapted to be fixedly secured to said first element; and an optical fiber cable including first and second elongated portions in coaxial alignment and closely axially fixed relative to one another; the first cable portion being fixedly secured to said source and adapted to receive and transmit therethrough radiation from said source; the second cable portion being adapted to be fixedly secured to said second element; one of said first and second cable portions being rotatable about its longitudinal axis relative to the other as a function of rotational movement of the element to which it is secured; the respective cable portions having interface surfaces with face angles of approximately equivalent magnitude; whereby, when the interface surfaces are parallel, a major portion of the radiation transmitted through and exiting the first cable portion will be received by and transmitted through the second cable portion, and when the interface surfaces are non-parallel, radiation exiting the first cable portion will be reflected at the interface surface of the second cable portion in varying amounts as a function of angular displacement from parallel of the interface surface of the second cable portion with respect to the interface surface of the first cable portion, maximal reflection occurring when the interface surfaces are rotated 180° from the true parallel position, thereby resulting in attenuation of radiation being transmitted through the cable.

2. The invention of claim 1 further comprising means for measuring the intensity of radiation being transmitted through and exiting the second cable portion.

3. The invention of claim 1 wherein the source includes at least one light emitting diode arranged such that radiation emitted therefrom is beamed at the end of the first cable portion opposite the interface surface; whereby the radiation enters and is transmitted through the first cable portion to exit the interface surface.

4. The invention of claim 1 wherein the face angles of the interface surfaces are between 30° and 35° relative to the longitudinal axis of the cable portions.

5. The invention of claim 1 wherein the first and second cable portions are fixed axially with respect to each other, the spacing between the first and second cable portions being approximately 0.002 inches to 0.005 inches.

6. The invention of claim 1 wherein the optical fiber cable consists of a single fiber.

7. The invention of claim 1 wherein the optical fiber cable consists of a strand of multiple fibers.

* * * * *